Sept. 12, 1961      D. M. LIPKIN      2,999,639
ANALOG MULTIPLYING CIRCUITS
Filed Nov. 19, 1957

*INVENTOR.*
Daniel M. Lipkin
BY

2,999,639
ANALOG MULTIPLYING CIRCUITS
Daniel M. Lipkin, Philadelphia, Pa., assignor to Sperry Rand Corporation, New York, N.Y., a corporation of Delaware
Filed Nov. 19, 1957, Ser. No. 697,344
10 Claims. (Cl. 235—194)

The present invention relates to circuits adapted to produce an output proportional to the analog product of two inputs; and is concerned with improved arrangements adapted to effect analog multiplication through the use of transversely magnetizable structures. In particular, the present invention relates to an improved multiplying structure utilizing passive components only and adapted to give an output signal corresponding to the instantaneous mathematical product of two rapidly varying electrical input signals. In accomplishing this desirable purpose, and as will be described subsequently, the present invention utilizes transverse magnetic structures in effecting the desired signal multiplication whereby an accurate multiplication is effected with little equipment and power loss.

It is accordingly an object of the present invention to provide an improved high-speed analog multiplier.

Another object of the present invention resides in the provision of circuits adapted to effect accurate multiplication of rapidly varying electrical signals with little equipment.

Still another object of the present invention resides in the provision of improved analog multiplying circuits which utilize passive components throughout.

Still another object of the present invention resides in the provision of an improved magnetic circuit adapted to effect an output signal, the magnitude of which is accurately proportional to the product of the instantaneous magnitudes of two input signals, such as two audio-frequency signals, for example; and in providing this improved magnetic circuit, the present invention is particularly concerned with effecting the desired accurate output in an efficient manner.

In providing for the foregoing objects and advantages, the present invention contemplates the provision of an improved analog multiplying circuit using principles of transverse magnetization. Before proceeding with a detailed discussion of the instant invention, a brief review of the principles upon which it rests will facilitate an understanding of the overall circuit. The following discussion is meant to be in the nature of a summary only, and a more detailed mathematical and graphical development of the concepts to be explained may be found in certain of my prior copending applications, particularly Patent No. 2,921,251, for: "Transverse Magnetic Devices"; Patent No. 2,814,733, for "Transverse Magnetic Squaring and Frequency Doubling Devices"; and Patent No. 2,811,652, for: "Pulse Type Transverse Magnetic Amplifier."

In general, transverse magnetic structures of the types discussed in the aforementioned prior copending applications, as well as of the types employed in the present invention, comprise one or more cores of magnetic material having transverse magnetizing fields simultaneously applied thereto. It is possible to obtain quantitatively predictable B—H relationships in such transverse core structures (i.e. the resultant B vector is a simple mathematical function of the resultant H vector), by observing strictly the condition that the scalar magnitude of the vector resultant magnetizing force be kept above a predeterminable level which is characteristic of the magnetic material. When this particular condition is met, the vector flux density $\vec{B}$ in the material is given substantially by the vector equation:

$$\vec{B} = B_s \frac{\vec{H}}{h}$$

where $B_s$ is the saturation flux density magnitude for the material; $\vec{H}$ is the resultant magnetizing force vector in the material; and $h$ is the scalar magnitude of $\vec{H}$. The above equation states, first, that the vector $\vec{B}$ is in the same direction as the vector $\vec{H}$, and second, that the vector $\vec{B}$ has the fixed magnitude $B_s$.

The above relationship between $\vec{B}$ and $\vec{H}$ is justified when the aforementioned condition is satisfied, i.e., when the scalar magnitude of the vector resultant magnetizing force is kept above a predeterminable level which is characteristic of the magnetic material. When this particular condition is in fact satisfied, the core itself does not absorb or store energy even temporarily, but merely serves to transfer energy between the sources of the transverse fields, thereby yielding substantially loss-less operation. The foregoing condition is in fact satisfied when the two transverse fields applied to a given core satisfy the condition: $h \geq h_p$, wherein $h_p$ is the predeterminable level referred to previously. As a practical matter, the predeterminable level $h_p$ may be taken to be that value of magnetizing force larger than the value at which the specific rotational hysteresis loss for a given core peaks or reaches a maximum and for which the specific rotational hysteresis loss is appreciably less than said maximum rotational hysteresis loss.

This generalized statement may be summarized by stating that the resultant magnetizing field applied to a given core of magnetic material must be such that the material is constantly maintained in a saturated condition; and moreover must be such that the core is in fact magnetized into its region of vanishing rotational hysteresis.

As a practical matter, transverse magnetic structures operating in the foregoing manner comprise a core of magnetic material having means for simultaneously applying mutually orthogonal fields therein. An output effect may be produced from such a transverse structure by varying the magnitude of at least one of these transverse fields; and so long as the previously discussed conditions are maintained, the operation of the device will be substantially loss-less. The transverse fields so applied to a given core of magnetic material may in fact comprise a biasing field applied to the core in one orientation, and a signal field applied to the said core in a transverse orientation. The signal field may, if desired, be varied to produce an output effect.

As is discussed in my aforementioned prior copending application Serial No. 494,905, now Patent Number 2,921,251 certain desirable effects may be achieved by limiting the possible variation in the signal field. In particular, a squaring circuit can be produced through the use of transverse magnetization principles by impressing on a core of magnetic material a bias field of sufficiently large magnitude to hold the core in a region of vanishing rotational hysteresis; and by simultaneously producing an input signal field variation of relatively small magnitude in a direction transverse to that of the said bias field. It is through use of this particular squaring characteristic that the improved multiplying circuit of the present invention may be effected.

The foregoing objects, advantages, construction and operation of the present invention will become more readily apparent from the following description and accompanying drawings, in which.

Figure 1:
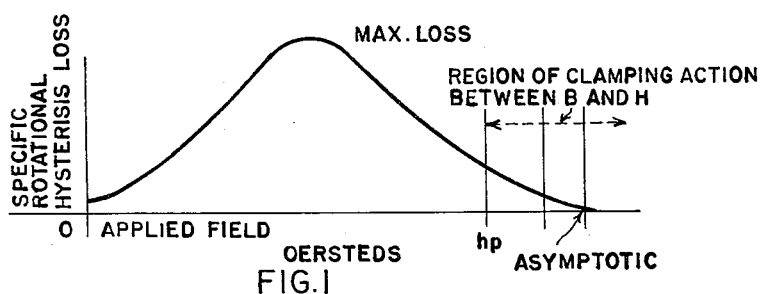
FIGURE 1 is a diagrammatical showing of the hysteresis loss for a magnetic core of a wide range of applied magnetic fields with particular reference to the region of vanishing rotational hysteresis.

FIGURE 1 shows how the rotational hysteresis loss in a magnetic material increases to a maximum in accordance with an increasing applied magnetic field; and then, as the magnetic field is further increased beyond the magnitude required for magnetic saturation, the rotational hysteresis loss decreases. That is, the curve representing this loss reaches a peak and then approaches the axis so that the region of vanishing hysteresis loss is reached and any changes of magnetization of the core will take place without storage or irreversible loss of energization in the core or magnetic shell.

Figure 2:
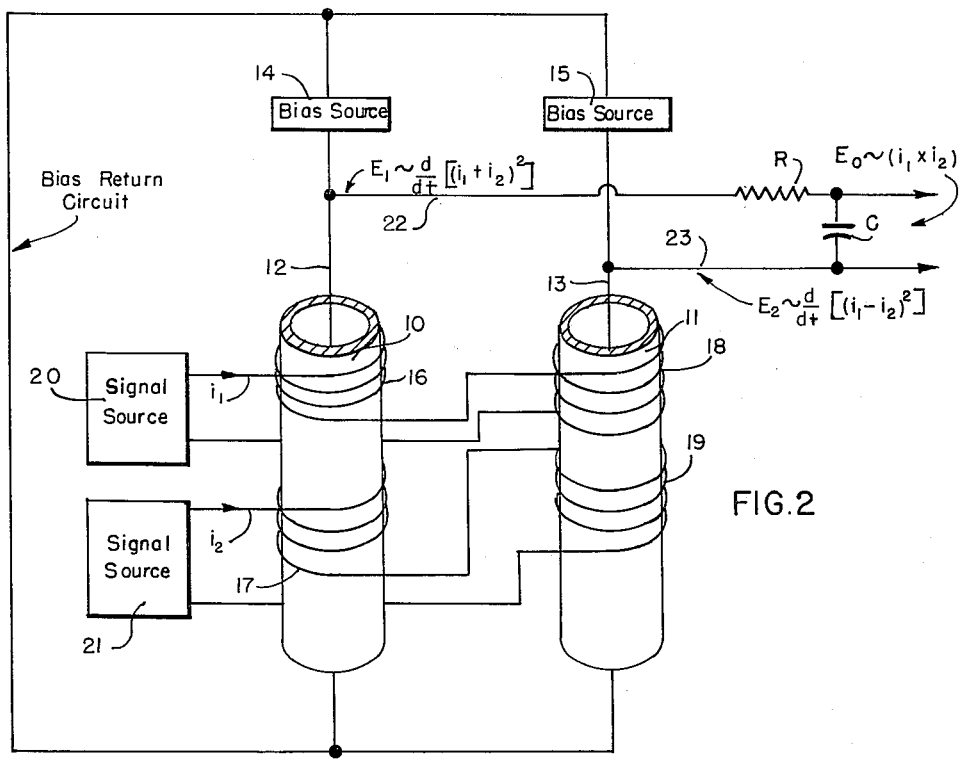
FIGURE 2 is a schematic diagram of one form of the invention.

Furthermore, by referring to FIGURE 2, it will be seen that in accordance with the present invention an improved analog multiplying circuit may comprise two cores 10 and 11, each of which operates in accordance with the transverse magnetization principles discussed previously. By way of example, the cores 10 and 11 have been illustrated as comprising hollow cylindrical or tubular cores, but it will be understood by those skilled in the art that other core configurations may be employed, provided the transverse fields characteristic of the present invention are applied thereto.

In the accompanying drawing, each of the cores 10 and 11 is associated with a bias winding 12 and 13, respectively, passing through the centers of the cores. Such an axial bias winding is, in fact, preferred when cores 10 and 11 comprise ferrite tubes. The said bias windings 12 and 13 have been depicted as comprising a single turn, but it will be understood that these windings may in fact comprise more than one turn, depending upon the particular characteristics of the circuit in question. The bias windings 12 and 13 are coupled to independent but equal D.C. bias current sources 14 and 15 respectively, and these D.C. bias current sources are so chosen that they tend to pass a bias current through the windings 12 and 13 of such large magnitude that the cores 10 and 11 are each caused to operate in a strongly saturated region characterized by vanishing rotational hysteresis.

The cores 10 and 11, in addition, are associated with input or signal windings 16, 17, 18 and 19, which are wound on the cores in a direction transverse to the directions of bias windings 12 and 13; and in the particular example illustrated, the windings 16 through 19 each have the same number of turns. Winding 16, carried by core 10, is connected in series with winding 18, carried by core 11; and these series connected windings are in turn coupled to a signal source 20. Similarly, the winding 17, carried by core 10, is connected in series with the winding 19, carried by core 11, and these two series connected windings are in turn coupled to a further signal source 21. Signal source 20 tends to pass a current $i_1$ through the series connected windings 16 and 18, thereby producing a magnetic field in each of the cores 10 and 11 which, in each of these cores, is respectively oriented orthogonally to the field produced by the corresponding bias winding 12 or 13 coupled to said core. Similarly, signal source 21 tends to pass a current $i_2$ through the series connected windings 17 and 19 which tends to produce a further field in each of the cores 10 and 11 which in these respective cores is orthogonal to that produced by the corresponding bias winding 12 or 13.

As explained in the aforementioned copending application Serial No. 494,905, the voltage induced in the output winding of transverse structures, such as have been described, is proportional to the time derivative of the input current squared where the field of the bias current is of a core saturating value and the field of the input current is much smaller than that produced by the bias. Windings 16 and 17, carried by core 10, are each wound upon the said core 10 in the same direction, whereby the resultant signal field produced in core 10 is proportional to $(i_1+i_2)$. Due to the flux aiding characteristics of the windings 16 and 17, and due to the actual relationship between signal sources 20, 21 and bias source 14, therefore, the output effect produced on output line 22, associated with core 10, comprises a voltage which is proportional to:

$$\frac{d}{dt}[(i_1+i_2)^2]$$

This particular voltage has been designated $E_1$ in the accompanying drawing.

Windings 18 and 19, carried by core 11, are wound in opposing directions on the said core 11, however, and accordingly, by an analysis similar to that given with respect to core 10 previously, it will be seen that the voltage appearing at output line 23, associated with core 11, is proportional to:

$$\frac{d}{dt}[(i_1-i_2)^2]$$

This particular voltage has been designated $E_2$.

Thus, by recognizing the squaring properties of which transverse magnetic structures are capable when the proper relationships between bias and signal sources are observed, and by utilizing flux aiding signal fields in one core and flux opposing signal fields in another core, two output voltages may be achieved which are proportional respectively to the derivatives of the signal current sums and differences squared.

The voltages appearing on lines 22 and 23 are impressed across a floating integrating circuit comprising a resistor R and capacitor C, with the output voltage $E_0$ being taken across the capacitor C in accordance with conventional integration concepts. By impressing the voltages $E_1$ and $E_2$ on opposing ends of the R-C integrating circuit, the voltages are in effect impressed on said integrating circuit in subtractive relation to one another, so that the squared expressions may be combined algebraically. This subtractive relation results in an effective cancellation of the square terms of $i_1$ and $i_2$ and a difference of four times the product of $i_1$ and $i_2$. Accordingly, the output voltage $E_0$ is proportional to the product of $i_1$ and $i_2$.

By reason of this particular consideration, therefore, it will be seen that an output voltage is achieved which is proportional to the product of the instantaneous magnitudes of input signals $i_1$ and $i_2$; and moreover, this output is achieved by use of a circuit comprising passive magnetic components only. These passive magnetic components comprise, as discussed previously, individual squaring circuits and should be balanced. However, by the very structure employed, any imbalance between the two squaring circuits comprising cores 10 and 11 respectively, can be easily corrected by changing slightly the number of turns on one or more of the input coils associated with the transversely magnetized cores. Moreover, it will be noted that due to the loss-less operation of the transverse magnetic structures comprising the present invention, the only power loss in the system is that of the integrating circuit R-C whereby the output achieved is not only highly accurate, but is moreover effected in a most efficient manner.

While I have thus described a preferred embodiment of my invention, many variations will be suggested to those skilled in the art, and it must therefore be emphasized that the foregoing discussion is meant to be illustrative only and should not be considered limitative of my invention. All such modifications and variations as are in accord with the principles described are meant to fall within the scope of the appended claims.

Having thus described my invention, I claim:

1. A control circuit comprising a plurality of cores of magnetic material, input means on each of said cores, means for simultaneously producing first and second control signals, means for applying said first and second signals to the input means of one of said cores thereby to effect additive magnetomotive forces in said one core, means for applying said first and second signals to the input means of the other of said cores thereby to effect subtractive magnetomotive forces in said other core, means for applying a further magnetomotive force to each of said cores thereby to cause said cores to operate in saturation in a region of vanishing rotational hysteresis, said further magnetomotive force being appreciably larger in magnitude than and being disposed transverse to the resultant magnetomotive forces produced in said cores by signal current flow in the input means of said cores, each of said cores including output means and means for comparing the magnitudes of output signals produced at the output means of said first and second cores.

2. The combination of claim 1 wherein said last-named means comprises an R-C integrating circuit, means coupling the output means of said one core to one end of said integrating circuit, and means coupling the output means of said other core to the other end of said integrating circuit.

3. The combination of claim 1 wherein said means for applying said further magnetomotive force to said cores comprises a plurality of independent bias windings individually carried by said plurality of cores respectively, and a plurality of independent bias current sources individually coupled to said plurality of bias windings respectively.

4. The combination of claim 3 wherein each of said cores is of tubular configuration, each of said bias windings being disposed in an axial direction on its associated tubular core.

5. An analog multiplying circuit comprising first and second transverse magnetic circuits, said circuits each including at least one magnetic core, means for applying a relatively large bias magnetizing field to each of said cores to cause said cores to operate in saturation in a region of vanishing hysteresis, means producting first and second signals to me multiplied, means for applying a first control magnetizing field to said first core proportional in magnitude to the sum of said first and second signals, said first control magnetizing field being oriented orthogonally to the saturating bias field in said first core and being small in magnitude as compared with said bias field in said first core, means for applying a second control magnetizing field to said second core proportional in magnitude to the difference of said first and second signals, said second control magnetizing field being oriented orthogonally to the saturating bias field in said second core and being small in magnitude as compared with said bias field in said second core, means for deriving output signals from each of said cores in response to the application of said first and second control fields, and means responsive to a predetermined combination of said output signals for deriving a further output signal.

6. An analog multiplying circuit comprising a plurality of transverse magnetic circuits including magnetic cores, bias magnetizing field means coupled to said cores for baising each of said cores thereby causing each of said cores to operate in a saturated region of vanishing rotational hysteresis, means producing a plurality of signals to be multiplied, means coupling said signals to said cores to produce control magnetizing fields in said cores which control magnetizing fields are oriented orthogonal to and are of small magnitude in relation to the fields produced in said cores by said bias magnetizing field means, means for deriving a plurality of output signals from said circuits which are proportional respectively to the squared sums and differences of said signals to be multiplied, and means for combining said plurality of output signals to derive a further output signal.

7. In combination, a plurality of magnetic cores, bias means for applying to each of said cores a magnetomotive force of sufficient magnitude to saturate each of said cores and to cause said cores to operate in the associated region of vanishing rotational hysteresis loss, input coil means on each of said cores responsive to signals applied thereto for applying magnetomotive forces to said cores in directions transverse to the magnetomotive forces produced by said bias means, first and second signal sources for supplying separate signals, means coupling both of said signal sources to the input coil means of one of said cores such that said input coil means on said one core applies a magnetomotive force proportional to the instantaneous sum of said signals from both of said sources to said one core, means coupling both of said signal sources to the input coil means of another of said cores such that said input coil means on said other core applies a magnetomotive force proportional to the instantaneous difference between the signals from both of said sources to said other core, means for deriving separate output signals from each of said cores, and output means for deriving a signal in accordance with a combination of said separate output signals from said cores.

8. The combination of claim 7 wherein the input coil means on said one core comprises first and second input windings wound in the same sense relative to one another on said one core, said first and second signal sources being coupled to said first and second windings on said one core respectively, the input means on said other core comprising first and second input windings wound in the opposite sense to one another on said other core, said first and second signal sources being coupled to said first and second windings on said other core respectively.

9. The combination of claim 8 including means connecting each of said first input coil windings together thereby to effect a first control circuit, means connecting each of said second input windings together thereby to effect a second control circuit, means coupling said first signal source to said first control circuit, and means coupling said second signal source to said second control circuit.

10. The combination of claim 9 wherein said output means comprises an integrating circuit, means for combining the output signals from each of said cores in a subtractive sense, and means for coupling said integrating circuit to said combining means.

References Cited in the file of this patent

UNITED STATES PATENTS

| 2,587,193 | Miller | Feb. 26, 1952 |
| 2,808,988 | Kafka | Oct. 8, 1957 |

FOREIGN PATENTS

| 553,594 | Italy | Dec. 28, 1956 |